Patented Sept. 7, 1943

2,328,537

UNITED STATES PATENT OFFICE 2,328,537

THICK-BODIED STARCH AND METHOD OF MAKING

George E. Felton and Herman H. Schopmeyer, Hammond, Ind., assignors to American Maize-Products Company, a corporation of Maine No Drawing. Application August 9, 1940, Serial No. 351,967

9 Claims. (Cl. 127—33)

This invention relates to a thick bodied starch product and the method of making it. More particularly, the invention relates to a starch which may be manufactured at low cost and which forms granules that are tough and resistant to disintegration on cooking with water.

When corn or like starch is cooked in water, say, in the proportion of about 1 part of the starch to 8 parts of water, the starch swells rapidly when the temperature reaches approximately 152° F. At that temperature, the mixture becomes a thick pasty mass. Raising the temperature further produces additional thickening for a short time. Prolonged heating, as in a bath of boiling water for fifteen minutes or so, makes the starch thin. On long heating at high temperatures, the starch decreases in viscosity and becomes quite fluid.

There has long been need in certain industries for an economically produced, modified starch that does not become thin on cooking and that may be formed into granules that resist disintegration.

In the manufacture of paper, for example, there is need of a sizing including starch in the form of granules of such size after swelling that the granules will be largely retained in the paper as formed on the paper machine. It is important also that the granules after swelling should not break as, in case of breakage, the retention of starch in the paper is extremely small.

Another industry requiring starch particles that do not break down under the conditions of use is the manufacture of salad dressings. In this manufacture, the selected ingredients including aqueous starch paste and acid are thoroughly mixed by being forced under pressure, through a small orifice or homogenizer. Under such conditions ordinary starch breaks down into such minute particles that very large quantities of the starch must be used in order to obtain the proper consistency in the salad dressing.

The present invention provides a starch product that is thick bodied and of high viscosity even after cooking and that forms granules which are remarkably resistant to disintegration in water. The invention provides also a method of making such starch product at low cost.

The invention comprises treating ordinary starch in the presence of a large amount of water and an acid chloride that is very reactive with starch in the presence of water. Among such chlorides that may be used are phosphorus oxychloride, phosphorus pentachloride, thio phosphoryl chloride, antimony pentachloride, and antimony oxychloride.

The selected chloride is mixed in small proportion with the starch, in the presence of water in excess and suitably in amount sufficient to permit the formation of an aqueous suspension of the starch in the water before reaction with the chloride is effected. For best results, the starch and water suspension is made alkaline before the chloride is added. Thus, the suspension is established at a pH above 7 and suitably at about 8 to 12, by the addition of sodium hydroxide, potassium hydroxide, or equivalent water-soluble alkaline substance. After the chloride has been introduced into the alkaline mixture, the reaction is allowed to proceed to substantial completion as, for instance, for a period of 30 minutes or so at either room or somewhat elevated temperatures. Then the mixture is treated with an acid as, for example, sulfuric, hydrochloric, or acetic acid, to return the pH to 7 or below and preferably to about 5 to 6. At this stage the starch modified as desired appears as solid material suspended in the liquid of the mixture. The solid starch product is then separated from the liquid, as by filtration or centrifuging. The product, if it is to be used in dry form is then washed with water to remove soluble substances and dried in a usual manner.

A sample of the starch made as described, when cooked in water and gelatinized, gives a hazy paste which sets to a stiff, rather crumbly gel. When used in the paper industry as sizing, the modified starch gives swollen granules that are readily retained to a large and satisfactory extent in the finished paper.

The extent of the increase of viscosity and the toughness of the granules of the starch product made as described varies somewhat in accordance with the conditions of treatment of the raw starch. One of the important conditions that may be varied in such way as to affect greatly the properties of the product is the proportion of the phosphorus oxychloride or the like that is used with the starch. In general, the proportion of the phosphorus oxychloride or the like may be varied from ¼ part to 5 parts for 100 parts dry weight of the raw starch. Larger proportions of the chloride within this range show relatively great effects on the toughness and viscosity of the resulting starch product. When only a very limited effect of the treatment is desired, then the proportion of the chloride may be even somewhat below ¼%.

In one example of the practice of the invention, 6,600 gallons of corn starch and water suspension of density 21° Bé. was adjusted by the addition of alkali to a pH of 11.5. There was then added slowly and with stirring 25 pounds of phosphorus oxychloride, the temperature being maintained at about 100° F. during the addition. Reaction ensued and was completed within a few minutes after the addition of the last of the oxychloride. The reacted mixture was neutralized with sulfuric acid and the acidity established at a pH of about 5 to 7. The mixture was then filtered to remove the solid starch product, washed on the filter with water to remove soluble materials, and dried.

The starch made as described in the immediately preceding example was tested for its properties by being made into a suspension with 15 times its weight of water and subsequently warming the suspension. The starch in the suspension was found to begin to swell at approximately 152° F. The swelling proceeded at a much slower rate than is obtained with raw starch under the same conditions, and the viscosity continued to increase even after 1½ hours cooking in a bath of boiling water. At the conclusion of that cooking period, the starch was found on examination to show granules that were highly swollen but unbroken and of very distinct outlines.

It is calculated that, in the reaction mixture including the 6,600 gallons of starch suspension and 25 pounds of phosphorus oxychloride, the proportion of the latter is about 0.1 part for 100 parts of the starch on the dry basis.

Using a larger proportion of phosphorus oxychloride, namely, 1 part or somewhat more for 100 parts of the starch and following the procedure described above, we have produced granules of the starch product which are extremely resistant to swelling and which when mixed with, say, four times their weight of water give pastes that will not thicken when cooked for even as long as 1 to 3 hours at 250° F.

Such a non-thickening starch product is made as follows: 100 parts of starch are made into an aqueous suspension of density 21° Bé. and treated with alkali to establish the pH at 11.5. The temperature is maintained at 100° F. Technical phosphorus oxychloride in the amount of 1 part is added slowly, with stirring. The resulting starch product is separated by filtration and is washed and dried.

Particularly good results have been obtained when the starch suspension, before treatment with the chloride is made alkaline, as described, to such an extent that the degree of alkalinity is adequate to cause increased reactivity but not pasting of the starch. A product so treated reacts quickly with the phosphorus oxychloride and produces a maximum of the desired toughening and bodying of the starch. While the invention is not limited to any theory of explanation of the results obtained, it is believed that a part of the thickening and toughening effect is due to the formation of a diphosphoric acid ester of the alkali-activated starch causing toughening or strengthening of the membrane which covers the granules of the starch used.

For some purposes, the starch may be treated with phosphorus oxychloride or the like in a neutral or acid solution. There is thus produced a product that is different from that described above, in that the starch which is modified at a pH value below 7 shows a rapidly increasing viscosity on cooking with water and then thinning as the cooking is continued. This starch, however, differs from the common starch in that the maximum viscosity obtained is much higher than that which results when common starch is cooked under comparable conditions.

In one example of the treatment of the starch under acid conditions, 100 parts of corn starch was formed into a suspension of density 21° Bé. and treated with 0.5 part of phosphorus oxychloride added slowly and with stirring, the pH of the said suspension having been adjusted to 4.8 before the oxychloride was added. A short time after the last of the oxychloride was added, sodium hydroxide solution was added to neutralize the acidity and establish the pH at 5.0. The mixture was then filtered, and the modified starch collected as solid material on the filter, was washed and dried.

This starch product which was modified at the pH of 4.8 was tested by cooking in a boiling water bath with 1 part of the modified starch to 15 parts of water. The mixture reached a maximum viscosity of 3,615 centipoises whereas common starch under comparable conditions gave a maximum viscosity of 2,600 centipoises, the viscosities in each case being measured at 200° F.

In another example of the invention, antimony pentachloride was substituted for phosphorus oxychloride in a method which otherwise was as described above. The product obtained by the use of the antimony chloride, in either alkaline, neutral, or acid reaction, is similar to that obtained with phosphorus oxychloride under neutral or acid conditions of reaction. In other words, the antimony chloride treatment is no more effective in the presence of alkali than in the phosphorus oxychloride treatment in the presence of an acid.

In the use of antimony oxychloride ($SbOCl_3$), 62.5 pounds of the oxychloride were added slowly and with stirring to 6,600 gallons of an aqueous starch suspension of density 21° Bé., the pH being maintained at 7. The reaction took place rapidly. The resulting product was filtered washed and dried. When tested it showed properties similar to the starch modified with phosphorus oxychloride at a pH of 4.8.

When a similar chloride compound of the kind described, as for instance, phosphorus pentachloride or thio phosphoryl chloride is used, the conditions to be employed and the proportions of materials are those which have been described above and illustrated in the specific examples.

As stated above, the proportions of the reactive chloride selected may be varied within limits, the exact amount to be chosen depending upon the extent of modification of properties desired. We have found that, even with such small proportions as 0.005 to 0.01 part of phosphorus oxychloride to 100 parts of starch, there is produced an appreciable increase in the viscosity and a decrease in the rate of thinning of the aqueous starch suspension on heating. When there is used ¼% of phosphorus oxychloride on the dry weight of the raw starch, cooking of an aqueous 1 to 10 suspension of the resulting product shows that gelatinization requires approximately one-half hour's cooking of the suspension at 200° F. When the proportion of oxychloride used is 2.5% of the dry weight of starch, then gelatinization does not occur to a substantial extent, even after several hours cooking at 200° F. of a starch paste including 1 part of starch to 10 of water.

Starch treated as described is adapted for use as paper size and in making salads.

In the specific examples given above, the starch used was from corn. Other starches may be substituted part for part for corn starch, as, for example, tapioca, potato, or sago starch. In all cases there is produced a modification of the starch to a product of increased viscosity and toughness of granule.

It will be understood that the details given are for the purpose of illustration, not restriction, and that variations within the spirit of the invention are intended to be included within the scope of the appended claims.

What we claim is:

1. The method of making a starch product which comprises forming an aqueous suspension of starch in undissolved condition, establishing the pH of the mixture at about 8 to 12 so that the alkalinity causes reactivity but not pasting of the starch, adding a minor proportion of a chloride selected from the group consisting of phosphorus oxychloride, phosphorus pentachloride, thio phosphoryl chloride, antimony pentachloride, and antimony oxychloride, maintaining contact between the said starch and chloride until reaction between the starch and chloride is effected, then making the mixture acidic, filtering out the starch product appearing as solid material in the mixture, and washing and drying the solid material collected by the filtration.

2. The method of making a starch product which comprises forming an aqueous suspension of pH above 7 but not above 12 of starch in undissolved condition and phosphorus oxychloride in the proportion of about one-tenth to five parts of the oxychloride for 100 parts of the starch, warming the starch and oxychloride mixture at a temperature below the pasting point of the starch until reaction is effected, then establishing the pH of the mixture at not above 7, and separating the resulting starch product from the liquid of the mixture.

3. A non-halogenated starch material having a viscosity substantially higher than that of ordinary starch and being in the form of tough granules, the said material being the product of the interaction at a pH above 7 but not substantially above 12 of starch suspended in undissolved condition in water and a minor proportion of a chloride selected from the group consisting of phosphorus oxychloride, phosphorus pentachloride, thio phosphoryl chloride, antimony pentachloride, and antimony oxychloride.

4. A non-halogenated starch material having high resistance to rupture of the granules on cooking in water, comprising the product of the interaction of an aqueous starch suspension and phosphorus oxychloride at a pH above 7 the oxychloride being used in minor proportion.

5. In making a thick bodied starch product in the form of tough granules, the method which comprises reacting starch in undissolved condition and suspended in water with a chloride selected from the group consisting of phosphorus oxychloride, phosphorus pentachloride, thio phosphoryl chloride, antimony pentachloride, and antimony oxychloride at a pH above 7 but not above 12, acidifying the resulting mixture, and then separating from the liquid present the starch product appearing as undissolved material, the said chloride being used in the proportion of approximately one-fourth to 5 parts for 100 parts of the starch.

6. The method described in claim 5, the reaction of the starch with the chloride being effected at a pH of approximately 8 to 12 and the chloride selected being phosphorus oxychloride.

7. The method described in claim 5, the reaction of the starch with the chloride being effected at a pH of approximately 8 to 12 and the chloride selected being thio phosphoryl chloride.

8. The method described in claim 5, the reaction of the starch with the chloride being effected at a pH of about 8 to 12 and the chloride selected being antimony pentachloride.

9. The method of making a starch product which comprises forming an aqueous mixture including starch in undissolved condition, a water soluble alkali in proportion to establish the pH of the mixture at about 8 to 12 so that the alkalinity is adequate to increase the reactivity without causing pasting of the starch, and a chloride selected from the group consisting of phosphorus oxychloride, phosphorus pentachloride, thio phosphoryl chloride, antimony pentachloride and antimony oxychloride, warming the mixture at a temperature below the pasting point of the starch until reaction between the starch and chloride is effected, then neutralizing the alkalinity of the mixture, and separating the resulting starch product in solid form from the neutralized mixture, the said chloride being used in the proportion of about 0.1 part to 5 parts for 100 parts of the starch.

GEORGE E. FELTON.
HERMAN H. SCHOPMEYER.